United States Patent
Seibel (10) Patent No.: US 6,484,092 B2
(45) Date of Patent: Nov. 19, 2002

(54) METHOD AND SYSTEM FOR DYNAMIC AND INTERACTIVE ROUTE FINDING

(75) Inventor: Richard A. Seibel, Pompton Lakes, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/818,993

(22) Filed: Mar. 28, 2001

(65) Prior Publication Data

US 2002/0152020 A1 Oct. 17, 2002

(51) Int. Cl.[7] .............................. G01C 21/28; G06G 7/78
(52) U.S. Cl. ............ 701/209; 701/24-26; 701/200-208; 701/210-215; 701/117-119; 340/905; 340/934; 340/995; 340/988; 340/989; 340/990; 455/456; 180/65.8
(58) Field of Search .................................. 701/200-215, 701/26, 25, 24, 23, 117-119; 340/905, 934, 995, 988, 989, 990; 455/456; 180/65.8; 320/107

(56) References Cited

U.S. PATENT DOCUMENTS

| | | | | |
|---|---|---|---|---|
| 5,790,974 A | * | 8/1998 | Tognazzini | 340/988 |
| 5,790,976 A | * | 8/1998 | Boll et al. | 180/65.8 |
| 5,913,917 A | * | 6/1999 | Murphy | 701/123 |
| 6,169,902 B1 | * | 1/2001 | Kawamoto | 342/357.12 |
| 6,259,405 B1 | * | 7/2001 | Stewart et al. | 342/457 |
| 6,282,492 B1 | * | 8/2001 | Gorai et al. | 701/209 |
| 6,334,086 B1 | * | 12/2001 | Park et al. | 340/905 |
| 2001/0029425 A1 | * | 10/2001 | Myr | 701/200 |

* cited by examiner

*Primary Examiner*—William Cuchlinski, Jr.
*Assistant Examiner*—Ronnie Mancho
(74) *Attorney, Agent, or Firm*—Pillsbury Winthrop LLP (57) ABSTRACT

A method and system for dynamic and interactive navigation is presented. A navigation request is received from a user. The navigation request comprises an originating location description, a destination location description, and at least one criterion to be satisfied by a desired route. Dynamic condition information associated with at least one route between the originating location and the destination location is retrieved. Based on the dynamic condition information, a desired route between the originating location and the destination location is determined.

30 Claims, 7 Drawing Sheets

METHOD AND SYSTEM FOR DYNAMIC AND INTERACTIVE ROUTE FINDING

BACKGROUND

1. Field

The present invention relates in general to navigation. Specifically, the present invention relates to methods and systems for dynamic and interactive navigation.

2. General Background and Related Art

Route finding methods or navigation methods are used to identify one or more routes between a specified originating location and a destination location. The identified routes are often determined based on certain user-specified criteria, such as shortest or fastest travel time. Evaluation of a route with respect to specified criteria is usually performed using recorded road information, such as length of road and road speed limit. Such information is static and does not incorporate the dynamics of the road. Examples of such dynamics include traffic congestion, road construction, or snow conditions. Dynamic information may significantly affect route evaluation.

Route finding methods that rely on static information may not accurately estimate travel time between an originating location and a destination location. In addition, the exclusive use of static information may preclude a route finding method from flexibly altering a route during travel. For example, if a user takes a route recommended by a navigation method based on a "fastest" route criterion, the user has no recourse if traffic on the route is at a standstill. If the user requests a new route based on the same criterion, the navigation method may recommend the same route because the method has no access to dynamic information, such as traffic information, that may trigger an unsatisfactory evaluation of the earlier-recommended route.

Therefore, what is needed is a navigation method and system that incorporates various kinds of dynamic information in determining a route.

DETAILED DESCRIPTION

The following detailed description refers to the accompanying drawings that illustrate exemplary embodiments of the present inventions. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A method and system for dynamic and interactive navigation, as described herein, involves receiving a navigation request from a user. The navigation request may comprise an originating location description, a destination location description, and at least one criterion to be satisfied by a desired route. Dynamic condition information associated with at least one route between the originating location and the destination location is retrieved. Based on the dynamic condition information, a desired route from the originating location to the destination location is determined.

Figure 1:
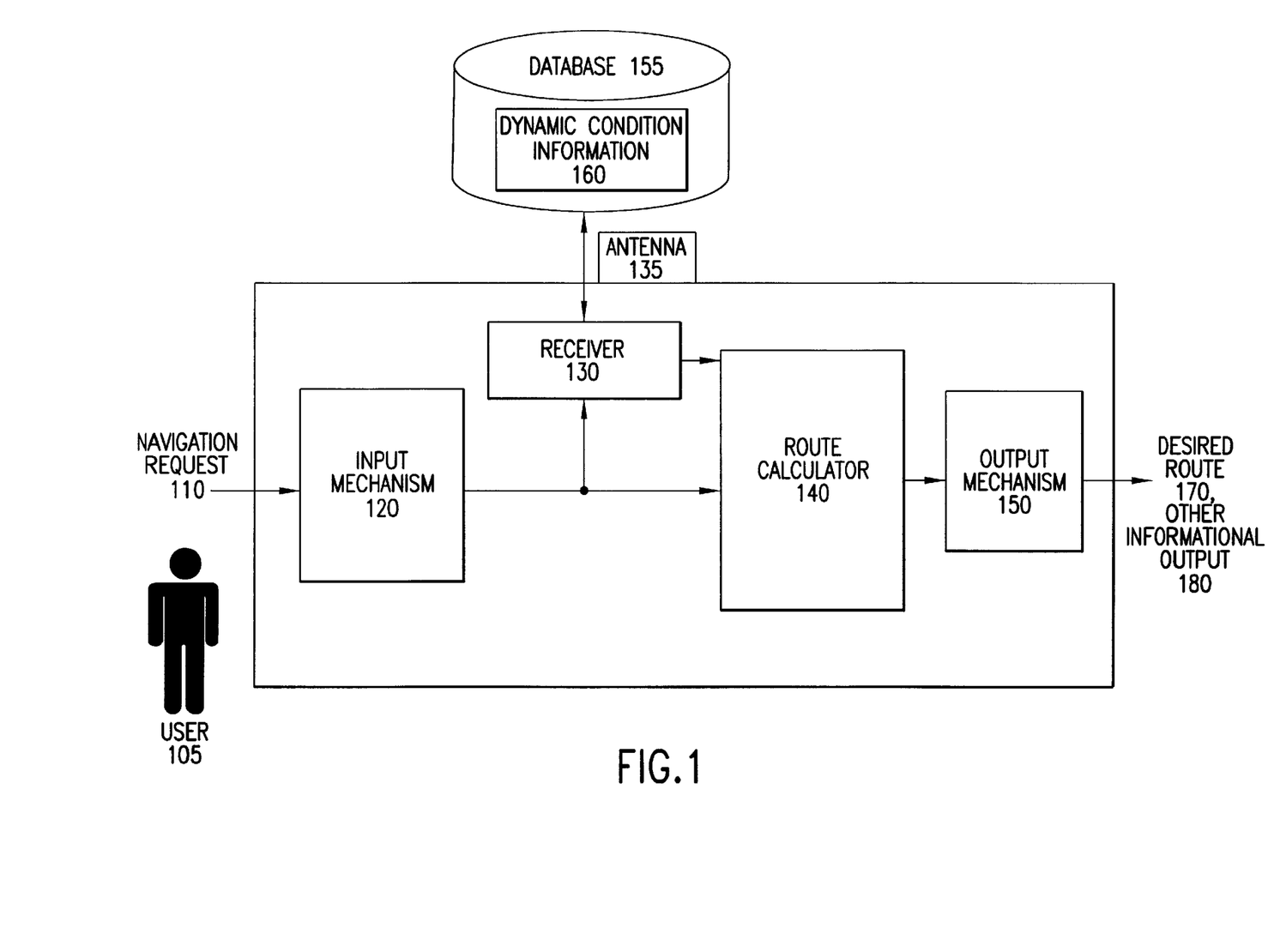
FIG. 1 is a high-level block diagram of a navigation system according to an embodiment of the present invention.

FIG. 1 illustrates navigation system 100 according to an embodiment of the present invention. System 100 comprises input mechanism 120, receiver 130, route calculator 140, output mechanism 150, and database 155. Database 155 includes dynamic condition information 160. Various components of system 100 may be integrated into, or coupled with, a navigational device, such as a handheld subscriber unit or a unit configured to be mounted in a vehicle, such as a car, truck, bicycle, motorcycle, golfcart, or wheelchair. System 100 may communicate with other local or remote devices via wireless means or wire-based means. As such, system 100 may include an antenna 135.

Input mechanism 120 receives a navigation request 110 from a user 105. Navigation request 110 may include an originating location description, a destination location description, and at least one criterion to be satisfied by a desired route. Location descriptions may comprise, for example, a street address, a location relative to a landmark, a location in coordinates, or an alias previously associated with the location by user 105. A criterion may specify one or more attributes of a desired route or routes. For instance, a criterion may include "short, "shortest," "fast," "fastest," "least expensive," "safest," "most picturesque," and "energy efficient."

Input mechanism 120 may comprise, for example, a speech processing input mechanism, a keypad, a keyboard, or a mouse. Receiver 130 receives navigation request 110 from input mechanism 120. Receiver 130 may retrieve, from database 155, dynamic condition information 160 associated with at least one route between an originating location and a destination location.

Dynamic condition information 160 may be stored on database 155 or in other databases. Database 155 may comprise a local database or a remote database accessible to system 100 via the Internet, an intranet, or a local area network (LAN). Alternatively, dynamic condition information 160 need not be stored, but may be generated and transmitted to system 100.

Dynamic condition information 160 may comprise any data relevant to routes traversed or potentially traversed by a user. For instance, dynamic condition information 160 may comprise dynamic and static information relating to predicted weather, current weather, current road conditions (e.g., lane closures or road closings), and current traffic conditions. Further, dynamic condition information 160 may comprise time-, date-, and season-specific information; for instance, traffic may be especially heavy on the eve of a holiday. Availability of critical resources, such as a ferry, may also be included in dynamic condition information 160. In general, dynamic condition information 160 may be obtained via any of a number of data access means, such as the Internet, a radio data system, or a wireless communications link to a bulletin board system (BBS). In particular, Internet websites may provide information in standardized formats that may be updated nationwide or continent-wide using standard parsing algorithms. For audio signals emanating from a radio data system, a speech processing input mechanism may acquire and process the information.

Dynamic condition information 160 may be obtained by polling providers of such information at predetermined times. For example, information providers may be polled when user 105 approaches decision points along a route. Polling may also occur at prescribed intervals, such as once per minute. In other embodiments, user 105 may input dynamic condition information 160 via input mechanism 120. When user 105, upon approaching the on-ramp of an expressway, notes that the expressway is severely congested, user 105 may input this information via input mechanism 120. Accordingly, user 105 may be rerouted by system 100 or may receive an estimate of the probable delay.

Dynamic condition information 160 may also include user-specific information, such as preferences of user 105. User preferences may be initialized based on preferences stored on a medium, and may be updated during navigation. Such user preferences may include information concerning risk. Specifically, user 105 may prefer to not risk traversing a route that has one or more predetermined characteristics. For instance, if snow is predicted or reported along a candidate route, user 105 may not wish to traverse that route. As such, user 105 may not be presented with that route. Alternatively, user 105 may be presented with potentially hazardous routes, and may decide whether to select or reject the routes. Risk factors may be applied after a candidate set of routes is determined in view of other dynamic condition information.

User preferences may further include a probability, or measure of confidence, that a desired route has a characteristic desired by user 105. If user 105 seeks the "fastest" routes, and user preferences specify a probability of 90%, then only candidate routes that are at least 90% likely to be the "fastest" route may be presented to user 105 by output mechanism 150. User preferences may be stored on a medium or dynamically received by system 100 during navigation.

Route calculator 140 receives dynamic condition information 160 and navigation request 110 as inputs. Based on dynamic condition information 160, route calculator 140 may determine a desired route or routes 170 between an originating location and a destination location specified in navigation request 110. User 105 may select a desired route from among the set of candidate routes. In an exemplary implementation, the retrieval of dynamic condition information 160 and determination of a desired route 170 are iterated until the destination location is reached, as detected by route calculator 140 or another such processor. As such, user 105 may be rerouted as user 105 navigates toward a final destination location.

Pursuant to well known methodologies in the art, route calculator 140 may incorporate algorithms that assign cost factors or weights to various parameters, such as dynamic condition information parameters. Multiplication of cost factors and the parameters, and summation of the resulting products, may generate numeric values, or "costs," for each route. These costs may then be compared. Such algorithms may be probabilistic in nature. For instance, if one hour is estimated to reach a destination, the travel time may be associated with a probability of 0.9, or 90 percent. Of course, route calculator 140 may employ other algorithms, including algorithms within a neural network. As such, cost factors or weights may be updated with experience. For instance, user actual times versus predicted times on similar roads under similar conditions, as well as how various conditions affect actual time versus predicted time, may be considered by route calculator 140.

Route calculator 140 may also retrieve parameters from a user database. Such a user database, which may be contained in database 155 or another database, may include information that reflects historical behavior of various users of navigation system 100. For example, if both a husband and wife utilize navigation system 100, the user database may reflect the fact that one or both spouses typically engage cruise control and that one spouse drives faster than the other spouse on highways. Route calculator 140 may incorporate such parameters in order to more accurately determine costs of routes.

Additionally, route calculator 140 may determine that dynamic condition information 160 necessitates intervention by user 105. Dynamic condition information may be presented to user 105 via output mechanism 150. Via input mechanism 120, user 105 may then specify a navigation change request.

For instance, user 105 may be informed that, "there is a traffic jam ahead that is predicted to be cleared in one hour. Your estimated time to hit the traffic jam is 45 minutes. Do you wish to consider alternate routes?". Similarly, user 105 may be informed that, "there is a problem which will necessitate an estimated delay of two hours if you go via the second intermediate destination. Rerouting and missing the second intermediate destination will save you an estimated hour-and-a-half. Do you still wish to go via the second intermediate destination?"

Desired route 170 or other informational output 180 may be conveyed to user 105 via output mechanism 150. Output mechanism 150 may comprise, for example, a speech synthesis output mechanism, an LCD display, a Braille output device, or a printer. Other informational output 180 may comprise status messages relating to dynamic condition information 160, such as estimated arrival time, or messages requesting user 105 to take action, such as to input a new navigation request 110 into input mechanism 120.

Figure 2:
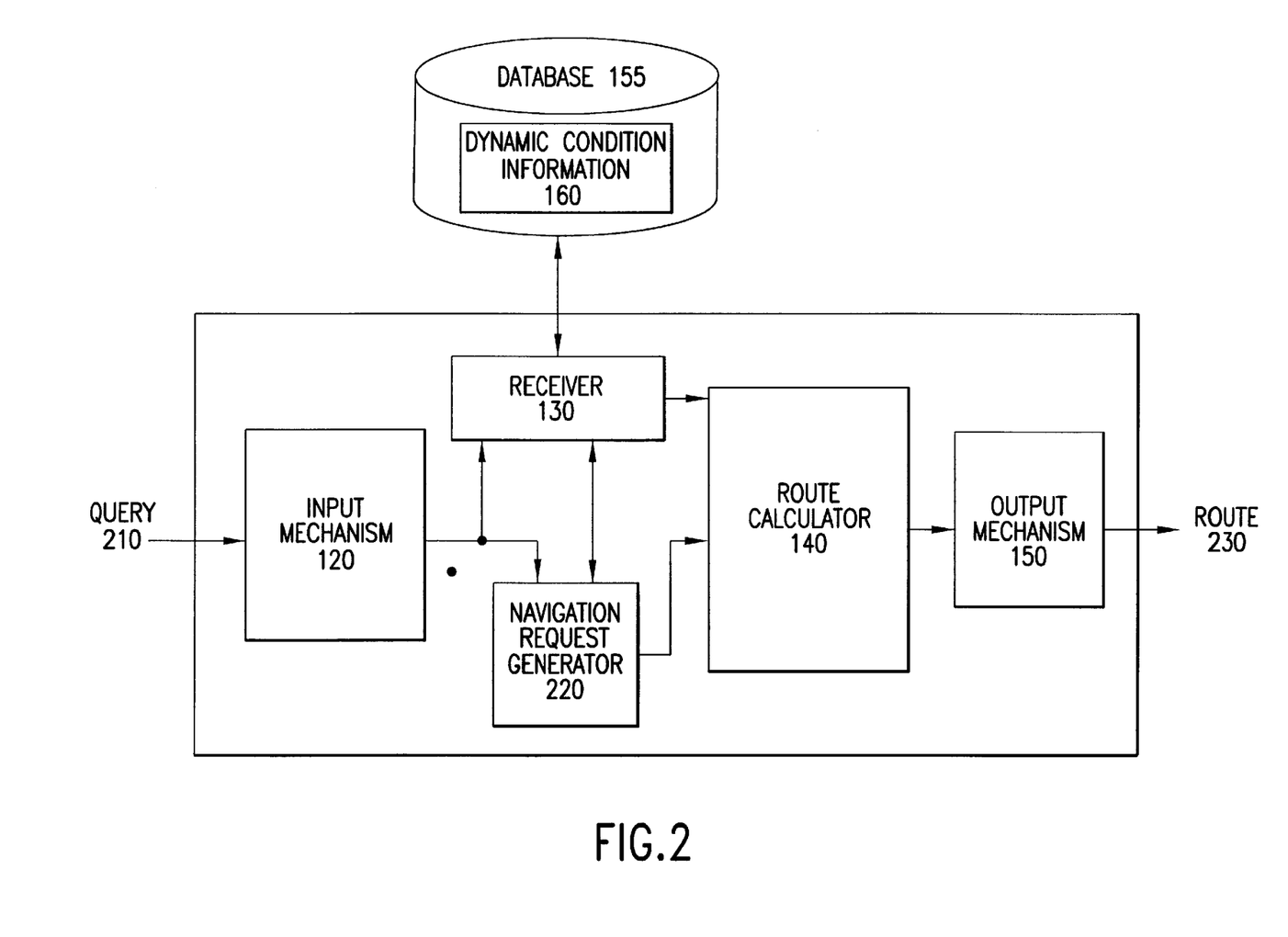
FIG. 2 is a high-level block diagram of a navigation system according to an embodiment of the present invention.

FIG. 2 is a high-level block diagram of navigation system 200 according to another embodiment of the present invention. System 200 comprises input mechanism 120, receiver 130, navigation request generator 220, route calculator 140, output mechanism 150, and database 155.

Input mechanism 120, receiver 130, route calculator 140, output mechanism 150, and database 155 are described above. In addition, input mechanism 120 may receive a query 210 provided by user 105. Query 210 may comprise a location, such as a desired destination location. The location may comprise one or more particular locations or generic locations. Receiver 130 receives query 210 and retrieves dynamic condition information 160 based on query 210. For instance, query 210 may comprise the genus "art museum." Receiver 130 may retrieve dynamic condition information 160 that includes locations of particular art museums, such as particular art museums within a predetermined distance of user 105, or within a predetermined distance of a route user 105 is presently traversing. Locations specified in query 210 may also relate to nearby tourist attractions.

Query 210 may also include a query criterion. Such a criterion may further define the location or locations specified in query 210. For instance, a query criterion may include the cost to patronize an establishment. Therefore, if a query specifies "restaurant" and "cost to patronize," navigation request generator 220 may determine routes to restaurants and associated dining costs. Additional criteria may include time to reach the restaurant, distance to reach the restaurant, and name or type of restaurant. Thus, user 105 may query for Chinese restaurants located within an hour of the present position of user 105 and situated along the present route or another suitable route. If multiple restaurants are found by navigation request generator 220, then the relative costs may be calculated and compared to enable user 105 to make a more informed decision as to which restaurant to patronize. Via a connection to another information database (not shown), navigation request generator 220 may also cross-reference the returned restaurant options with telephone book entries. Thus, user 105 may call desired restaurants from a cellular phone to ascertain the ability of the restaurant to accommodate user 105 and the requisite number of guests.

Based on dynamic condition information 160, navigation request generator 220 may determine zero or more destination locations that satisfy query 210. User 105 may then select a particular destination location from among the destination locations determined by navigation request generator 220. Accordingly, navigation request generator 220 may then generate an updated navigation request based on the selected destination location. Thus, navigation request generator 220 may perform rerouting functions, including those described above.

For example, navigation request generator 220 may determine respective destination locations for three art museums. Interactively, user 105 may select from among these locations. Navigation request generator 220 may then forward a navigation request to route calculator 140 that includes the chosen destination location. Route calculator 140 may determine route 230 such that user 105 may navigate to the chosen art museum.

Figure 3:
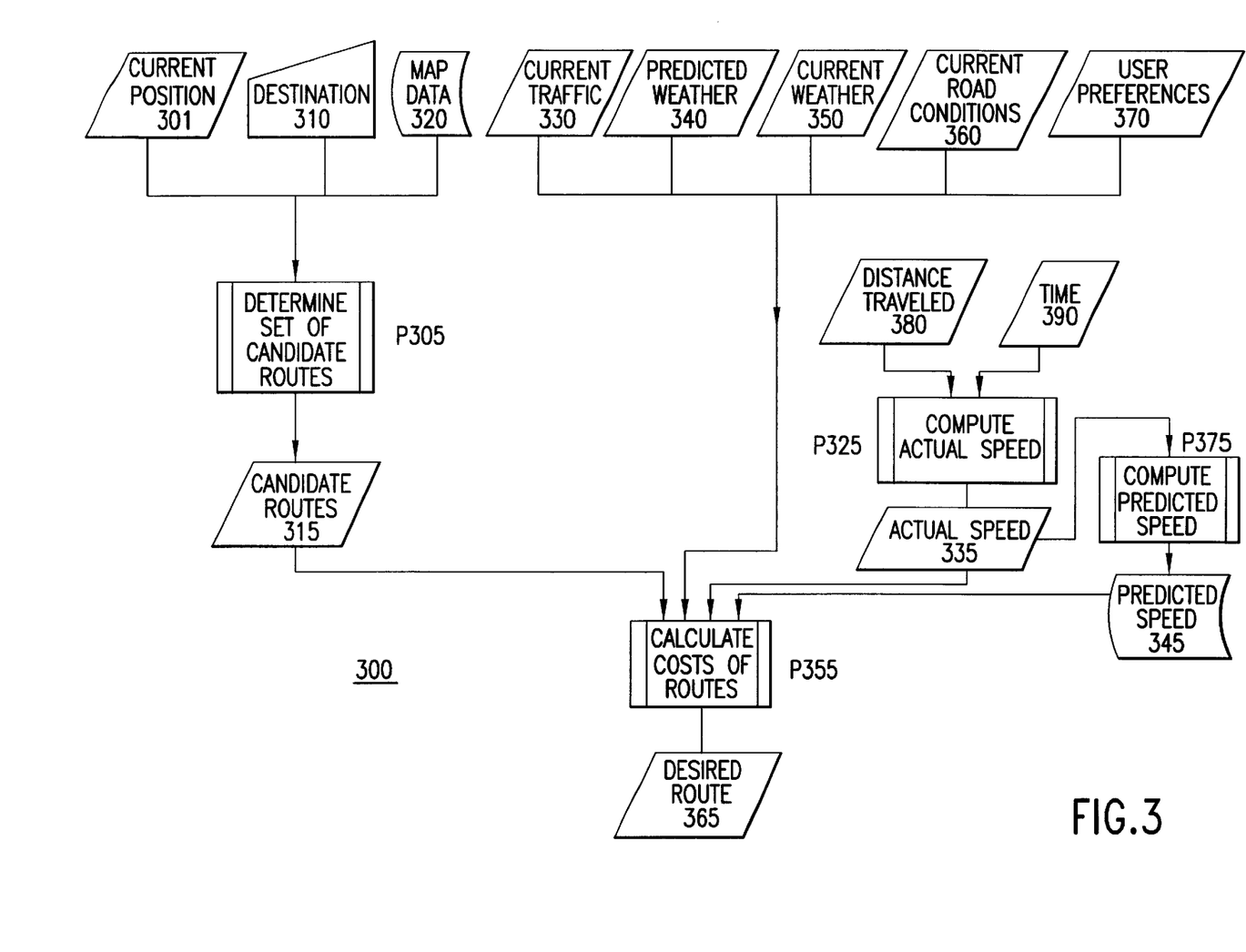
FIG. 3 is a flow diagram illustrating a method according to an embodiment of the present invention.

FIG. 3 is a high-level flow diagram illustrating method 300 according to the present invention. A current position 301, a destination 310, and map data 320 are inputs to process 305. Current position 301 may comprise geographic coordinates of a user, such as those provided by a Global Positioning Satellite (GPS) receiver. Alternatively, current position 301 may be supplied by a user via an input mechanism or by a navigation device that accesses a look-up table. Destination 310 may be supplied by a user via an input mechanism, or may be extracted from a database of locations. Map data 320 may comprise map information stored locally on a medium or retrieved from a remote server or service provider. It is to be appreciated that map data 320, though represented in FIG. 3 as stored data, may comprise data that is generated and transmitted directly to a processor of a navigation system.

Based on current position 301, destination 310, and map data 320, process P305 determines a set of candidate routes 315. Each candidate route 315 may begin at current position 301 and end at destination 310, and may comprise directions to enable user 105 to traverse a route from current position 301 to destination 310.

Process P355 calculates costs of candidate routes 305 in view of dynamic condition information, including current traffic 330, predicted weather 340, current weather 350, current road conditions 360, and user preferences 370. Process P305 outputs desired route 365 or a set of routes.

In calculating costs of candidate routes, process P355 may also consider speed of the user, including actual and/or predicted speed. For instance, information concerning speed may be coupled with traffic information to determine "fast" routes for a driver, such as an interstate truck driver. Based on information provided by process P355, a fleet operator may reroute the driver to another warehouse to optimize distribution operations. Process P325 may compute actual speed 335 based on distance traveled 380 and time traveled 390. Actual speed 335 may also be acquired via a connection to a vehicle speedometer. Actual speed 335 may be inputted to process P375, which computes predicted speed 345 based on, for example, historical data for a user. Thus, actual speed 335 may be compared to predicted speed 345, and the difference may be used in the future to make increasingly accurate predictions. As such, a neural network may be employed in conjunction with the present invention. Neural networks (with feedback) may be incorporated to generate various other data measures, such as predicted weather 340 or desired route 365.

Figure 4:
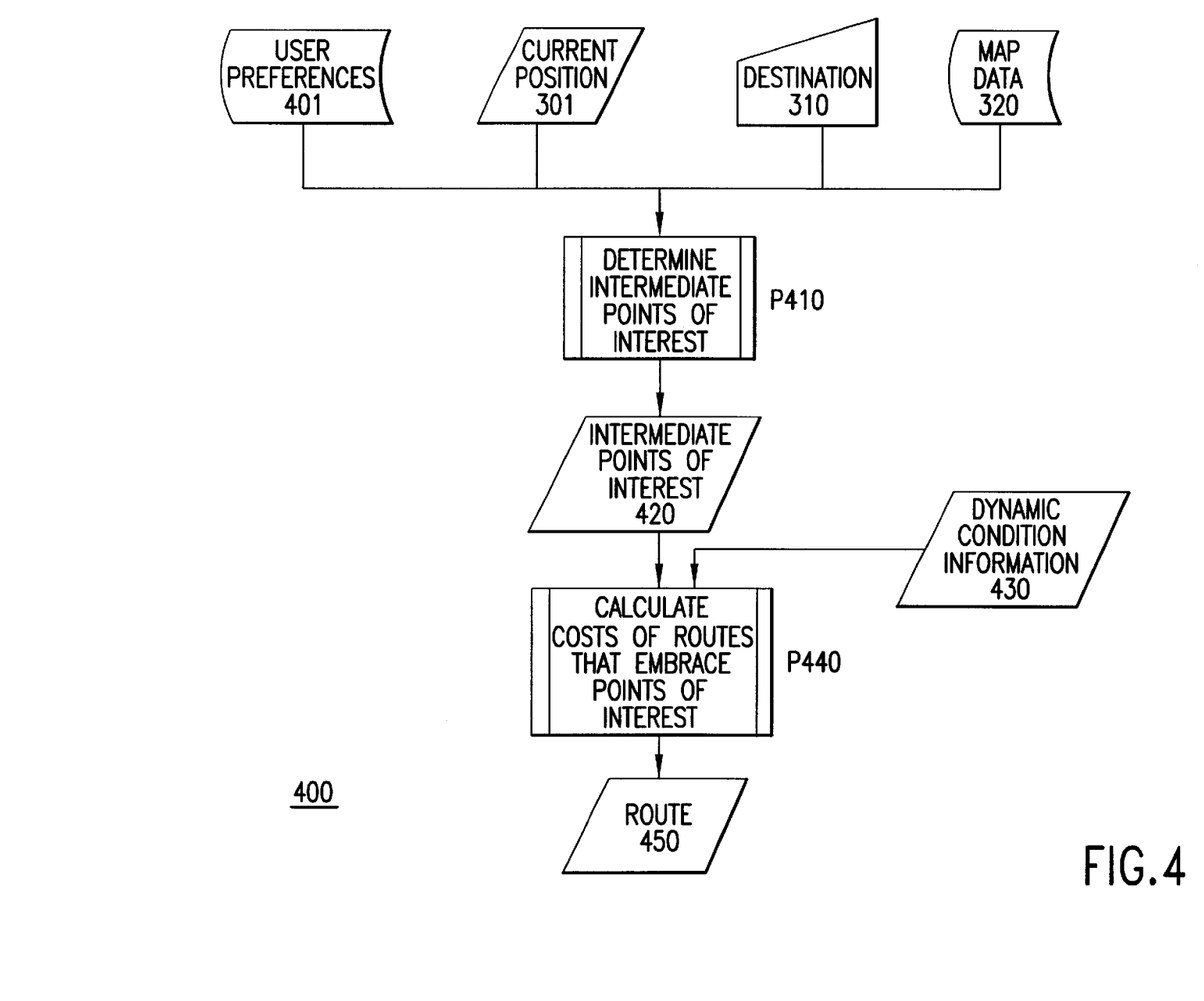
FIG. 4 is a flow diagram illustrating a method according to an embodiment of the present invention.

FIG. 4 is a flow diagram illustrating another embodiment of the present invention. As shown, user preferences 401, current position 301, destination 310, and map data 320 are inputted to process P410. User preferences 401 may comprise preferences as to points of interest about which a user seeks information. For instance, user preferences may include the list "museum," "park," "national monument," "waterfall," "outlet mall," "hospital," and "service station." User preferences 401 may also include the name of specific store franchises. It is to be understood that such user preferences may be stored or acquired in other ways. For instance, an array of codes associated with types of points of interest may be stored.

Based on the above inputs, process P410, via navigation request generator 220, route calculator 140, or another processor (not shown), determines intermediate points of interest 420 along one or more routes between current position 301 and destination 310. Intermediate points of interest 420 and dynamic condition information 430 are then inputted to process P440. Process P440 calculates costs of routes that embrace intermediate points of interest 420. Process P440 may output one or more such routes 450. Process P440 may occur at the outset of, and during navigation. For instance, when a user approaches a point of interest, the user may be notified how much additional time would be required to take a side trip. The user may then choose to be rerouted or continue along the present course. In other embodiments, a user may specify a desired time of arrival, and information relating to potential alternate routes may be supplied using the desired time of arrival as a reference. For instance, the user may be informed that an alternate route may result in the user arriving at the destination ten minutes after the desired arrival time.

Figure 5:
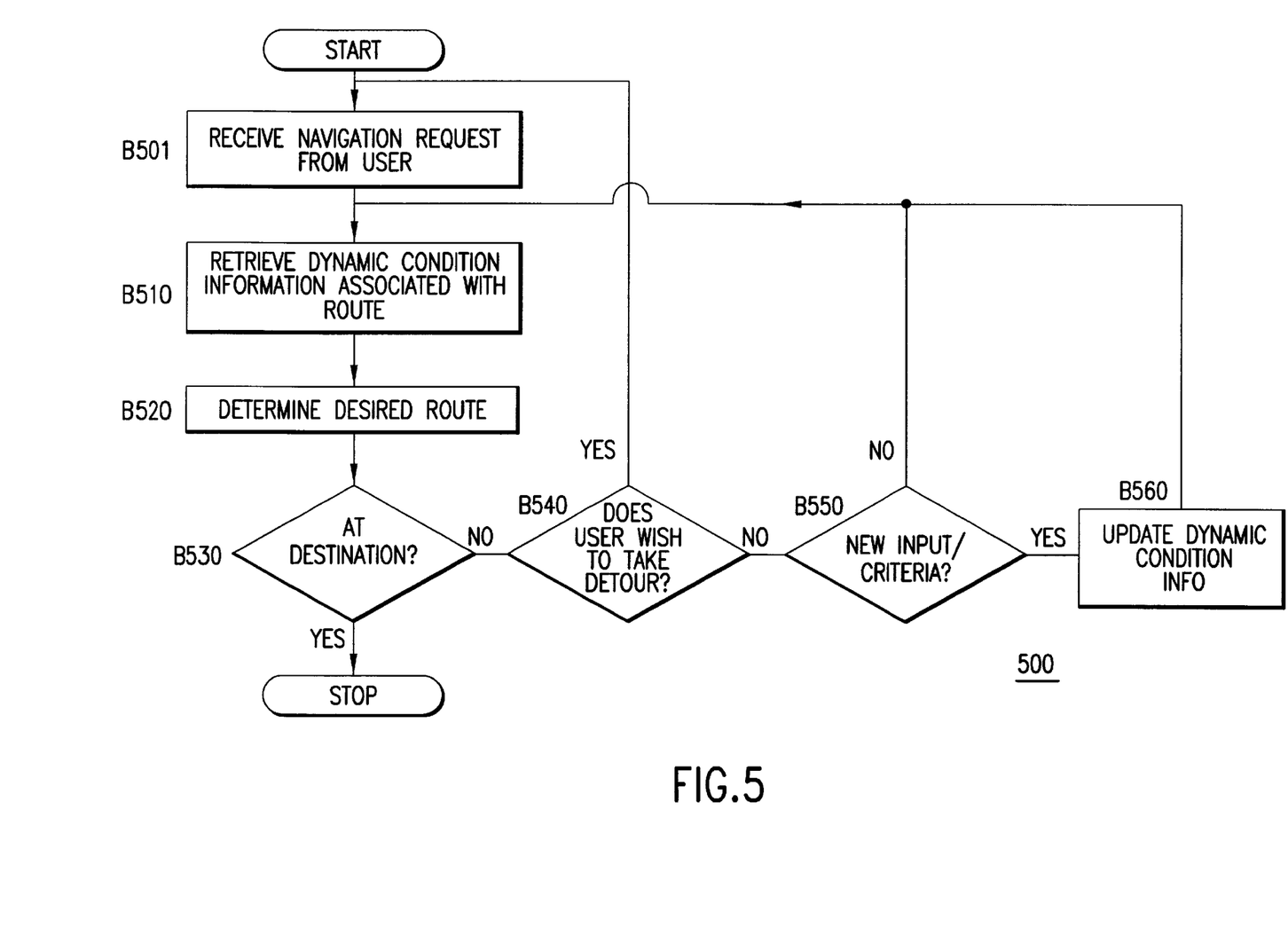
FIG. 5 is a flow diagram illustrating a method according to an embodiment of the present invention.

FIG. 5 is a flowchart illustrating method 500 according to the present invention. In block B501, a navigation request is received from a user. In block B510, dynamic condition information associated with a route is retrieved. A desired route is determined in block B520. In block B530, the method tests whether the user is at the intended destination. If the answer is yes, then the method ceases. If the answer is no, then in block B540, the method tests whether the user wishes to take a detour. If the user does wish to take a detour, then a new navigation request is received from the user in block B501. If not, then in block B550, the method tests whether the user has entered new input or criteria. If not, then in block B510, the method continues to retrieve dynamic condition information associated with the route. If new input or criteria has been entered, then in block B560, dynamic condition information is updated, and the method returns to block B510. Accordingly, new dynamic condition information is retrieved, and a new desired route is determined in block B520.

Figure 6:
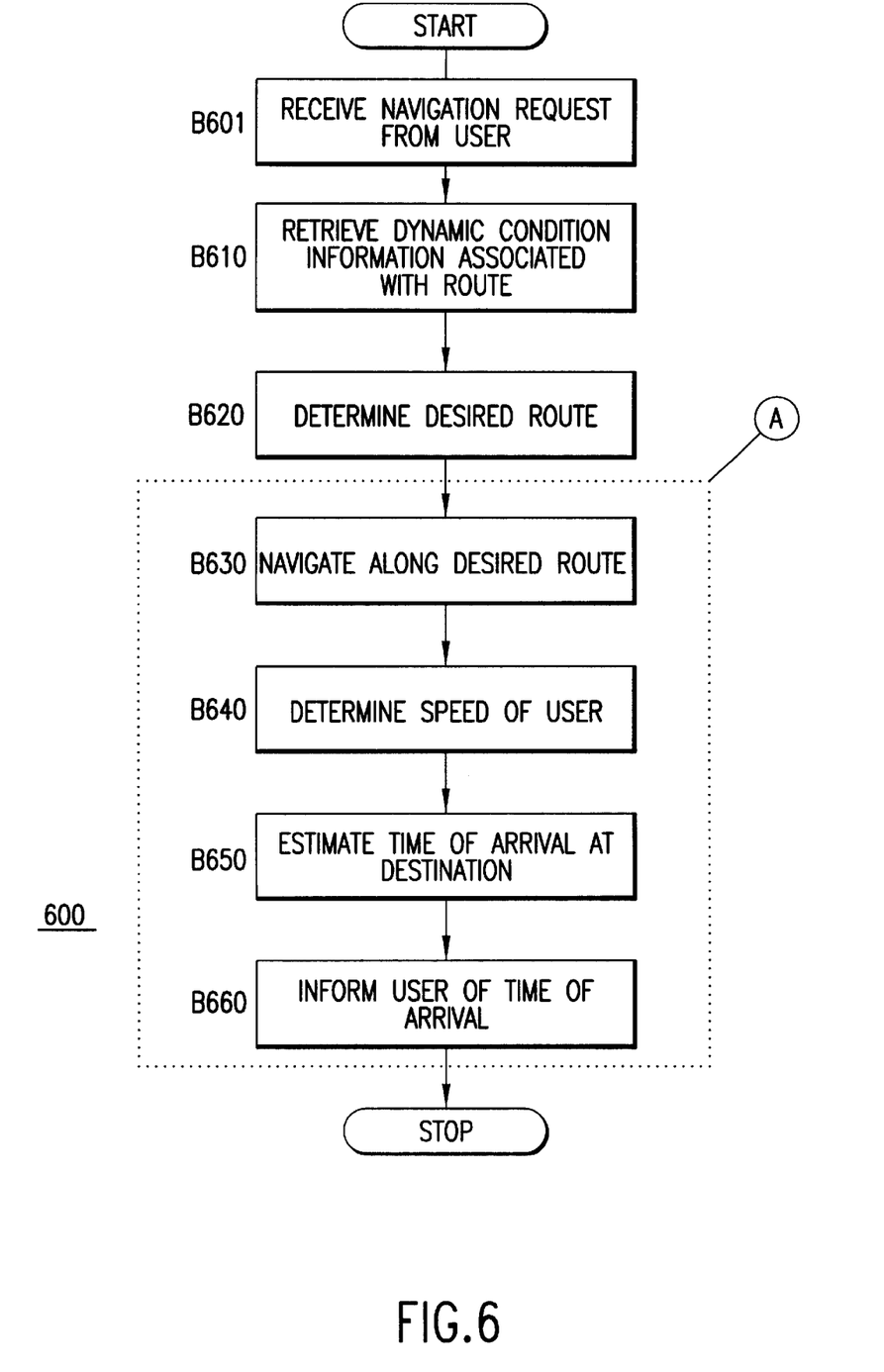
FIG. 6 is a flow diagram illustrating a method according to an embodiment of the present invention.

FIG. 6 illustrates method 600 according to another embodiment of the present invention. In blocks B601 through B620, method 600 tracks blocks B501 through B520 of method 500 in FIG. 5 above. Dashed portion A includes additional steps. In block B630, a user navigates along a desired route. The speed of the user is determined in block B640. The time of arrival of the user at the destination is estimated in block B650. The user is then informed of the time of arrival in block B660.

Figure 7:
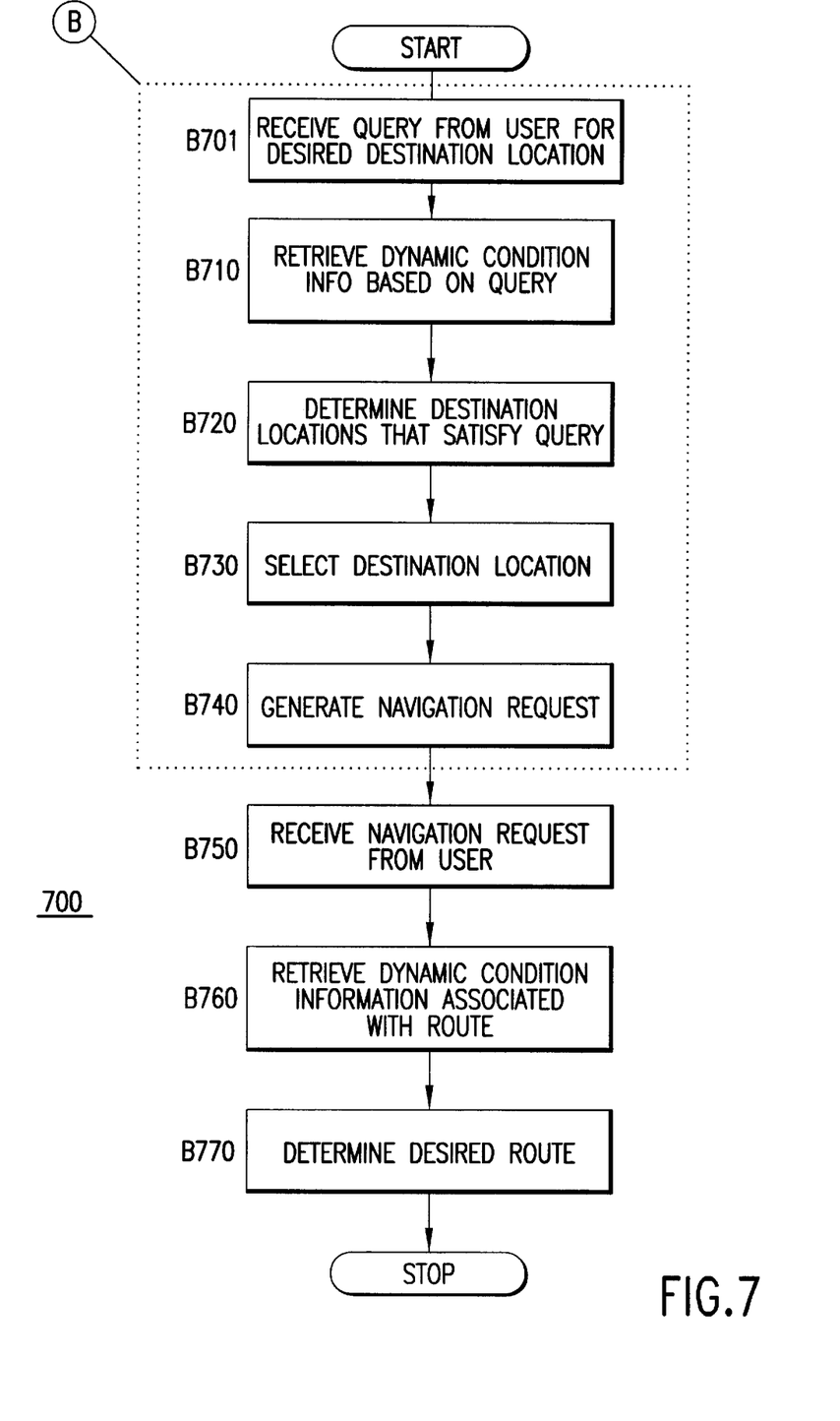
FIG. 7 is a flow diagram illustrating a method according to an embodiment of the present invention.

FIG. 7 illustrates method 700 according to another embodiment of the present invention. Blocks B750 through B770 track blocks B501 through B520 of the method shown in FIG. 5 above. Dashed portion B illustrates additional steps. In block B701, a query is received from the user for a desired destination location. Dynamic condition information is retrieved based on the query in block B710. In block B720, destination locations that satisfy the query are determined. In block B730, a destination location is selected. In block B740, a navigation request is generated.

The foregoing description of the preferred embodiments is provided to enable any person skilled in the art to make or use the present invention. Various modifications to these embodiments are possible, and the generic principles presented herein may be applied to other embodiments as well. For example, the present invention may be used in multiple settings, such as by individual end users, motorized fleet operators (such as bus, truck, van, or car operators), taxi and limousine drivers, state and local authorities, service providers, and long distance transportation providers.

Moreover, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed:

1. A method for a user to control risk in a dynamic and interactive navigation system, the method comprising:

receiving, from a user, a risk factor input associated with at least one predetermined risk attribute, the risk factor input specifying a user risk filter to apply to determination of routes, wherein, if a determined route has the at least one risk attribute, then the determined route is not presented to the user, and wherein the at least one risk attribute relates to a hazard associated with a route;

receiving a navigation request, the navigation request comprising a destination location description and at least one criterion to be satisfied by a desired route, wherein the at least one criterion differs from the at least one risk attribute;

retrieving dynamic condition information associated with at least one route between an originating location and the destination location, the retrieving not being triggered by an input of the user;

determining, according to the navigation request, at least one candidate route between the originating location and the destination location based on the dynamic condition information;

applying the user risk filter to the at least one candidate route; and determining, based on the applying, the desired route between the originating location and the destination location, wherein the desired route does not have the at least one risk attribute.

2. The method of claim 1, wherein the retrieving and the determining the desired route are iterated until the destination location is reached.

3. The method of claim 1, wherein the dynamic condition information includes a probability that the desired route has a characteristic desired by the user.

4. The method of claim 1, wherein the hazard includes a traffic or weather condition.

5. The method of claim 1, wherein the dynamic condition information includes time and date information.

6. The method of claim 1, wherein the dynamic condition information includes information about traffic and road conditions.

7. The method of claim 1, wherein the dynamic condition information includes driving speed.

8. The method of claim 1, wherein the dynamic condition information includes information generated by a neural network.

9. The method of claim 1, wherein the at least one criterion includes a fastest route.

10. The method of claim 1, further comprising:

presenting the dynamic condition information, retrieved by the retrieving, to the user;

interactively acquiring a navigation change request, the navigation change request being specified by the user based on the dynamic condition information presented to the user by the presenting; and updating the navigation request based on the navigation change request, prior to the determining the at least one candidate route.

11. The method of claim 10, wherein the dynamic condition information is presented to the user via a speech synthesis mechanism.

12. The method of claim 10, wherein the navigation change request is spoken by the user and received by a speech processing mechanism.

13. The method of claim 10, wherein the updating includes updating the destination location and the at least one criterion.

14. The method of claim 10, wherein the dynamic condition information includes one or more points of interest along a route.

15. The method of claim 1, further comprising:
   navigating along the desired route, determined by the determining the desired route;
   determining a speed at which the user is moving towards the destination location;
   estimating time of arrival at the destination location based on the speed, the destination location description, and the dynamic condition information; and
   informing the user about the time of arrival.

16. The method of claim 1, further comprising:
   receiving a query from a user for at least one desired destination location;
   retrieving dynamic condition information based on the query;
   determining zero or more destination locations that satisfy the query using dynamic condition information;
   selecting a destination location from the zero or more destination locations by the user; and
   generating the navigation request based on the destination location selected by the user.

17. The method of claim 16, wherein the query specifies a type of destination location and at least one query criterion.

18. The method of claim 17, wherein the at least one query criterion includes a cost to patronize an establishment.

19. The method of claim 1, wherein the dynamic condition information includes information from the Internet.

20. A user risk control system for dynamic and interactive navigation, the system comprising:
   an input mechanism,
   the input mechanism being configured to receive, from a user, a risk factor input associated with at least one predetermined risk attribute, the risk factor input specifying a user risk filter to apply to determination of routes,
   wherein, if a determined route has the at least one risk attribute, then the determined route is not presented to the user, and
   wherein the at least one risk attribute relates to a hazard associated with a route,
   the input mechanism being further configured to receive a navigation request, the navigation request comprising a destination location description and at least one criterion to be satisfied by a desired route, wherein the at least one criterion differs from the at least one risk attribute;
   a receiver configured to retrieve dynamic condition information associated with at least one route between an originating location and the destination location, the retrieval not being triggered by an input of the user; and
   a route calculator configured to determine, according to the navigation request, at least one candidate route between the originating location and the destination location based on the dynamic condition information, to apply the user risk filter to the at least one candidate route, and to determine, based on the applying, the desired route between the originating location and the destination location,
   wherein the desired route does not have the at least one risk attribute.

21. The system of claim 20, further comprising an output mechanism configured to convey information to the user, the information including the desired route.

22. The system of claim 21, wherein the output mechanism includes a speech synthesis mechanism.

23. The system of claim 21, wherein the input mechanism includes a speech processing mechanism configured to receive a navigation request spoken by the user.

24. The system of claim 21, further comprising a navigation request generator, and wherein:
   the input mechanism is configured to receive a query from a user for at least one desired destination location;
   the receiver is configured to retrieve dynamic condition information based on the query; and
   the navigation request generator is configured to determine zero or more destination locations that satisfy the query using dynamic condition information, and generate the navigation request based on a destination location, selected by the user, from the zero or more destination locations.

25. A computer-readable medium encoded with a plurality of processor-executable instruction sequences for:
   receiving, from a user, a risk factor input associated with at least one predetermined risk attribute, the risk factor input specifying a user risk filter to apply to determination of routes,
   wherein, if a determined route has the at least one risk attribute, then the determined route is not presented to the user, and
   wherein the at least one risk attribute relates to a hazard associated with a route;
   receiving a navigation request, the navigation request comprising a destination location description and at least one criterion to be satisfied by a desired route, wherein the at least one criterion differs from the at least one risk attribute;
   retrieving dynamic condition information associated with at least one route between an originating location and the destination location, the retrieving not being triggered by an input of the user;
   determining, according to the navigation request, at least one candidate route between the originating location and the destination location based on the dynamic condition information;
   applying the user risk filter to the at least one candidate route; and
   determining, based on the applying, the desired route between the originating location and the destination location,
   wherein the desired route does not have the at least one risk attribute.

26. The computer-readable medium of claim 25, wherein the retrieving and the determining the desired route are iterated until the destination location is reached.

27. The computer-readable medium of claim 25, further comprising processor-executable instruction sequences for:
   presenting the dynamic condition information, retrieved by the retrieving, to the user;
   interactively acquiring a navigation change request, the navigation change request being specified by the user based on the dynamic condition information presented to the user by the presenting; and updating the navigation request based on the navigation change request, prior to the determining the at least one candidate route.

28. The computer-readable medium of claim 25, further comprising processor-executable instruction sequences for:

navigating along the desired route, determined by the determining the desired route;

determining the speed at which the user is moving towards the destination location;

estimating time of arrival at the destination location based on the speed, the destination location description, and the dynamic condition information; and informing the user about the time of arrival.

29. The computer-readable medium of claim 25, further comprising processor-executable instruction sequences for:

receiving a query from a user for at least one desired destination location;

retrieving dynamic condition information based on the query;

determining zero or more destination locations that satisfy the query using dynamic condition information;

selecting a destination location from the zero or more destination locations by the user; and generating the navigation request based on the destination location selected by the user.

30. The method of claim 29, wherein the query specifies a type of destination location and at least one query criterion.

* * * * *